US010122800B2

(12) United States Patent
Sheth

(10) Patent No.: US 10,122,800 B2
(45) Date of Patent: Nov. 6, 2018

(54) VALIDATING RESOURCE IDENTIFIERS BEING REGISTERED FOR A TOLL-FREE DATA CAMPAIGN

(71) Applicant: Verizon Patent and Licensing Inc., Arlington, VA (US)

(72) Inventor: Krunal A. Sheth, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 457 days.

(21) Appl. No.: 14/835,789

(22) Filed: Aug. 26, 2015

(65) Prior Publication Data
US 2017/0064011 A1    Mar. 2, 2017

(51) Int. Cl.
*H04L 29/08* (2006.01)

(52) U.S. Cl.
CPC .............. *H04L 67/16* (2013.01); *H04L 67/02* (2013.01); *H04L 67/22* (2013.01)

(58) Field of Classification Search
CPC ......... H04L 67/16; H04L 67/02; H04L 67/22; H04L 12/1435; G06Q 30/00; G06Q 50/10
See application file for complete search history.

(56) References Cited

U.S. PATENT DOCUMENTS

| 9,014,663 | B2 * | 4/2015 | Saker | H04L 12/1407 |
| | | | | 455/406 |
| 9,275,405 | B1 * | 3/2016 | Delker | G06Q 30/04 |
| 2002/0176377 | A1 * | 11/2002 | Hamilton | H04L 12/66 |
| | | | | 370/328 |
| 2004/0267749 | A1 * | 12/2004 | Bhat | G06F 21/6218 |
| 2013/0318346 | A1 * | 11/2013 | Libonate | H04L 43/16 |
| | | | | 713/168 |
| 2014/0120867 | A1 * | 5/2014 | Hodges | G06Q 30/00 |
| | | | | 455/406 |
| 2014/0156794 | A1 * | 6/2014 | Sureshchandra | H04L 67/16 |
| | | | | 709/217 |
| 2014/0372286 | A1 * | 12/2014 | Neal | H04L 12/1475 |
| | | | | 705/39 |
| 2015/0278881 | A1 * | 10/2015 | Agrawal | G06Q 30/0277 |
| | | | | 705/14.73 |
| 2015/0334248 | A1 * | 11/2015 | Yin | H04M 15/09 |
| | | | | 455/406 |

OTHER PUBLICATIONS

Html5-tutorials.org, "Validating URLs," http://www.html5-tutorials.org/form-validation/validating-urls/, Mar. 28, 2012, 2 pages.

* cited by examiner

*Primary Examiner* — Todd L Barker

(57) ABSTRACT

A device may receive registration information for a toll-free data campaign. The toll-free data campaign may allow a content provider to pay costs of network data usage by user devices that access content associated with the toll-free data campaign. The device may identify a resource identifier included in the registration information. The resource identifier may identify the content associated with the toll-free data campaign. The device may apply a validation rule to the resource identifier. The device may determine whether the resource identifiers is associated with an error based on applying the validation rule. The device may selectively provide information that identifies the error based on determining whether the resource identifier is associated with the error.

20 Claims, 8 Drawing Sheets

VALIDATING RESOURCE IDENTIFIERS BEING REGISTERED FOR A TOLL-FREE DATA CAMPAIGN

BACKGROUND

Content providers, such as online media companies, may wish to deliver content (e.g., a document, a webpage, a movie, an audio file, or the like) to network users using a resource identifier. Network users may pay a network data usage fee to access the content. Some content providers may choose to subsidize the cost of network data usage, associated with the content, which would otherwise be paid by the network users accessing the content.

DETAILED DESCRIPTION OF PREFERRED EMBODIMENTS

The following detailed description of example implementations refers to the accompanying drawings. The same reference numbers in different drawings may identify the same or similar elements.

Content providers, such as online media companies, may choose to subsidize the cost of network data usage, associated with content (e.g., a document, a webpage, a movie, an audio file, or the like) available via a resource identifier. Otherwise, network users would pay the cost, to a network service provider, of the network data usage associated with the content. To subsidize the cost, the content providers may want to register, with the network service provider, a resource identifier, associated with the content, for a toll-free data campaign.

However, before registering the resource identifier for the toll-free data campaign, the network service provider may ensure that the resource identifier complies with validation rules. Validation rules may include checking a certain format of the resource identifier or comparing the resource identifier to registered resource identifiers. Checking the format is useful for ensuring that the resource identifier is usable and valid. Comparing the resource identifier to other resource identifiers is useful for ensuring that the resource identifier is not already registered, does not identify a subfolder of a registered resource identifier, does not identify a subdomain of a registered resource identifier, or the like. Implementations described herein allow the network service provider to ensure resource identifiers comply with the validation rules. Ensuring a resource identifier complies with the validation rules prevents a content provider from getting charged more than once for the network data usage associated with the resource identifier (e.g., because the content provider registered the resource identifier more than once), and saves processor and memory resources associated with a duplicate transaction and storage of duplicative or useless data (e.g., data associated with a duplicate, unusable, or invalid resource identifier).

Figure 1:
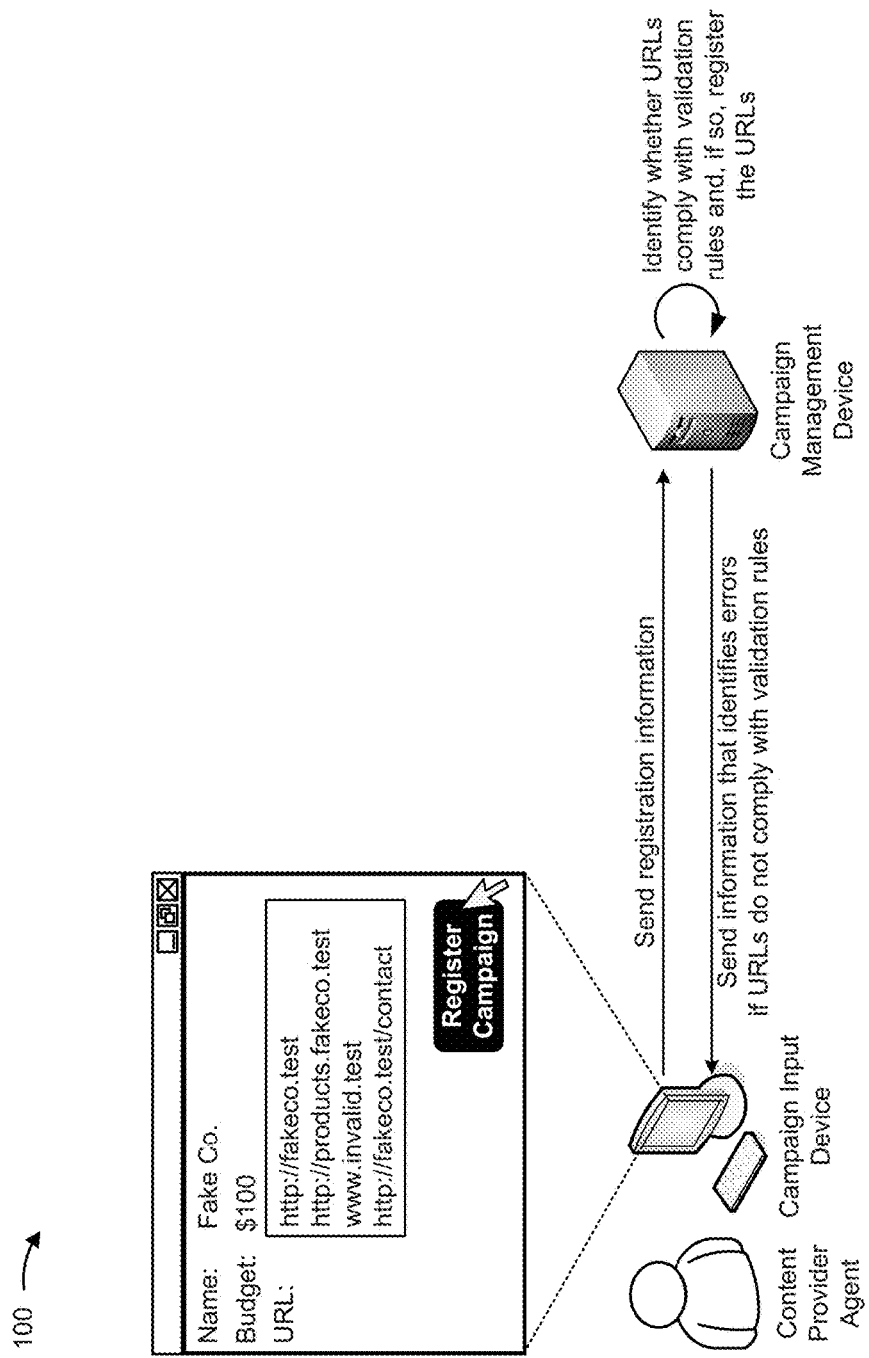
FIG. 1 is a diagram of an overview of an example implementation described herein.

FIG. 1 is a diagram of an overview of an example implementation 100 described herein. As shown in FIG. 1, assume that a content provider agent uses a campaign input device to register uniform resource locators (URLs) for a toll-free data campaign. As shown, the content provider agent inputs a name of a content provider (e.g., the company registering the resource identifier, or "Fake Co.," as shown), a budget associated with the campaign (e.g., $100, as shown), and the URLs to register. The content provider agent clicks on a button to register the resource identifiers (e.g., the URLs) for the campaign. The campaign input device sends registration information (e.g., information that includes the name, the budget, and the multiple resource identifiers) to a campaign management device. The campaign management device identifies whether the URLs comply with the validation rules. When the URLs comply with the validation rules, the campaign management device registers the URLs by sending the registration information to a campaign provisioning device. The campaign provisioning device creates, provisions, and enforces campaign rules for the toll-free data campaign based on the registration information. The campaign rules are used as limits for the toll-free campaign and are based on specific inputs from the registration information, such as the budget. When the URLs do not comply with the validation rules, the campaign management device sends information, to the campaign input device, that identifies errors in the URLs based on the validation rules.

By identifying errors in the URLs based on the validation rules, the campaign management device prevents errors, such as charging a content provider more than once for network data usage associated with a URL. Furthermore, the campaign management device can avoid registering any invalid URLs. In this way, the campaign management device saves processor and memory resources associated with unnecessary transactions or invalid URLs.

Figure 2:
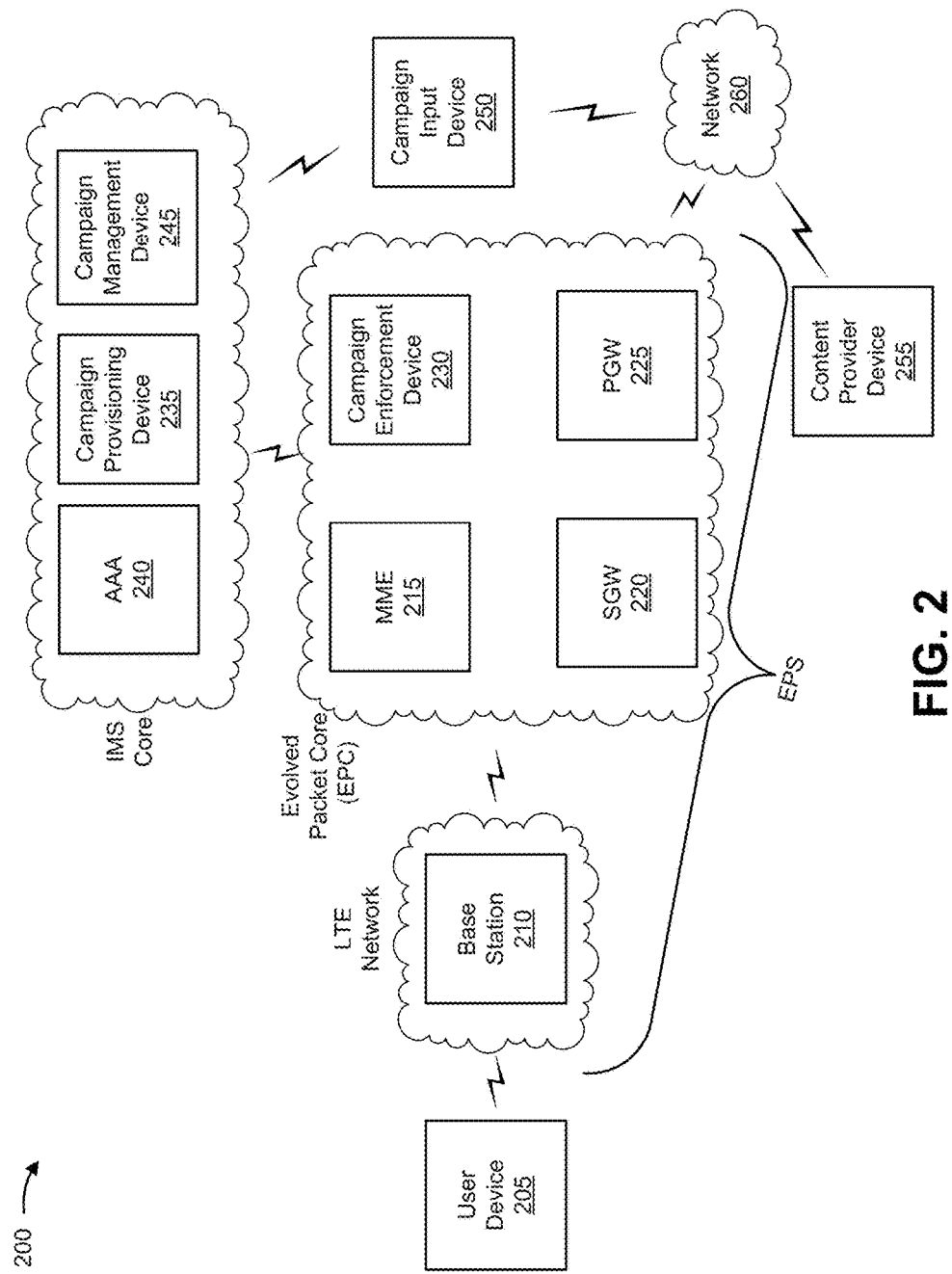
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a campaign enforcement device 230, a campaign provisioning device 235, an authentication, authorization, and accounting server (AAA) 240, a campaign management device 245, a campaign input device 250, a content provider device 255, and/or a network 260. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user devices 205 communicate with the EPC. The EPC may include MME 215, SGW 220, PGW 225, and/or campaign enforcement device 230 that enable user devices 205 to communicate with network 260 and/or an Internet protocol (IP) multimedia subsystem (IMS) core. The IMS core may include campaign provisioning device 235, AAA 240, and/or campaign management device 245, and may manage device registration and authentication, session initiation, registration information, etc., associated with user devices 205 and/or content provider devices 255. Campaign provisioning device 235, AAA 240, and/or campaign management device 245 may reside in the EPC and/or the IMS core.

User device 205 may include one or more devices capable of communicating with base station 210 and/or a network (e.g., network 260). For example, user device 205 may include a wireless communication device, a radiotelephone, a personal communications system (PCS) terminal (e.g., that may combine a cellular radiotelephone with data processing and data communications capabilities), a personal digital assistant (PDA), a smart phone, a laptop computer, a tablet computer, a personal gaming system, and/or a similar device. User device 205 may send traffic to and/or receive traffic from network 260 (e.g., via base station 210, SGW 220, and/or PGW 225).

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic to network 260 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 260 (e.g., via PGW 225) and/or other network devices associated with the EPC and/or the IMS core. SGW 220 may also receive traffic from network 260 and/or other network devices, and may send the received traffic to user device 205 via base station 210. Additionally, or alternatively, SGW 220 may perform operations associated with handing off user device 205 to and/or from an LTE network.

PGW 225 may include one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 260. Additionally, or alternatively, PGW 225 may receive traffic from network 260, and may send the traffic to user device 205 via SGW 220 and base station 210. PGW 225 may record data usage information (e.g., byte usage), and may provide the data usage information to AAA 240.

Campaign enforcement device 230 may include one or more devices capable of inspecting traffic and applying one or more campaign rules to the traffic. For example, campaign enforcement device 230 may include a gateway, a router, a modem, a switch, a firewall, a NIC, a hub, a bridge, a server, an OADM, or a similar device. Campaign enforcement device 230 may receive campaign rules from campaign provisioning device 235, may apply the campaign rules to traffic received from PGW 225, and may instruct PGW 225 how to handle the traffic based on the campaign rules. Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

Campaign provisioning device 235 may include one or more devices capable of receiving, generating, storing, processing, and/or providing information associated with a toll-free data service campaign (e.g., registration information, campaign rules, etc.). For example, campaign provisioning device 235 may include a server device or a similar device. Campaign provisioning device 235 may generate campaign rules, and may deploy the campaign rules, for enforcement, to one or more campaign enforcement devices 230 (e.g., associated with one or more cellular service areas).

AAA 240 may include one or more devices, such as one or more server devices, that perform authentication, authorization, and/or accounting operations for communication sessions associated with user device 205. For example, AAA 240 may store data usage information for user device 205, for a user associated with user device 205, for content provider device 255, for a content provider (e.g., that provides a toll-free data service), etc.

Campaign management device 245 may include one or more devices capable of receiving, processing, storing, generating, and/or providing information associated with a toll-free data campaign (e.g., registration information, validation rules, etc.). For example, campaign management device 245 may include a computing device, such as a server (e.g., an authentication server, a proxy server, a web server, etc.), a network device, or a similar type of device. In some implementations, campaign management device 245 may receive, from campaign input device 250, information associated with registering a resource identifier and may verify whether the resource identifier complies with validation rules.

Campaign input device 250 may include one or more devices capable of receiving, generating, storing, processing, and/or providing information associated with a toll-free data service campaign. For example, campaign input device 250 may include a desktop computer, a laptop computer, a mobile phone, a server device, or a similar device. Campaign input device 250 may receive input, from a content provider, that identifies registration information, and may provide the registration information to campaign management device 245.

Content provider device 255 may include one or more devices capable of providing content (e.g., to user device 205). For example, content provider device 255 may include a server device (e.g., a host server, a web server, an application server, etc.) or a similar device. Content provider device 255 may be associated with a content provider that provides a toll-free data service, where the content provider is charged for data usage rather than an end user associated with user device 205.

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
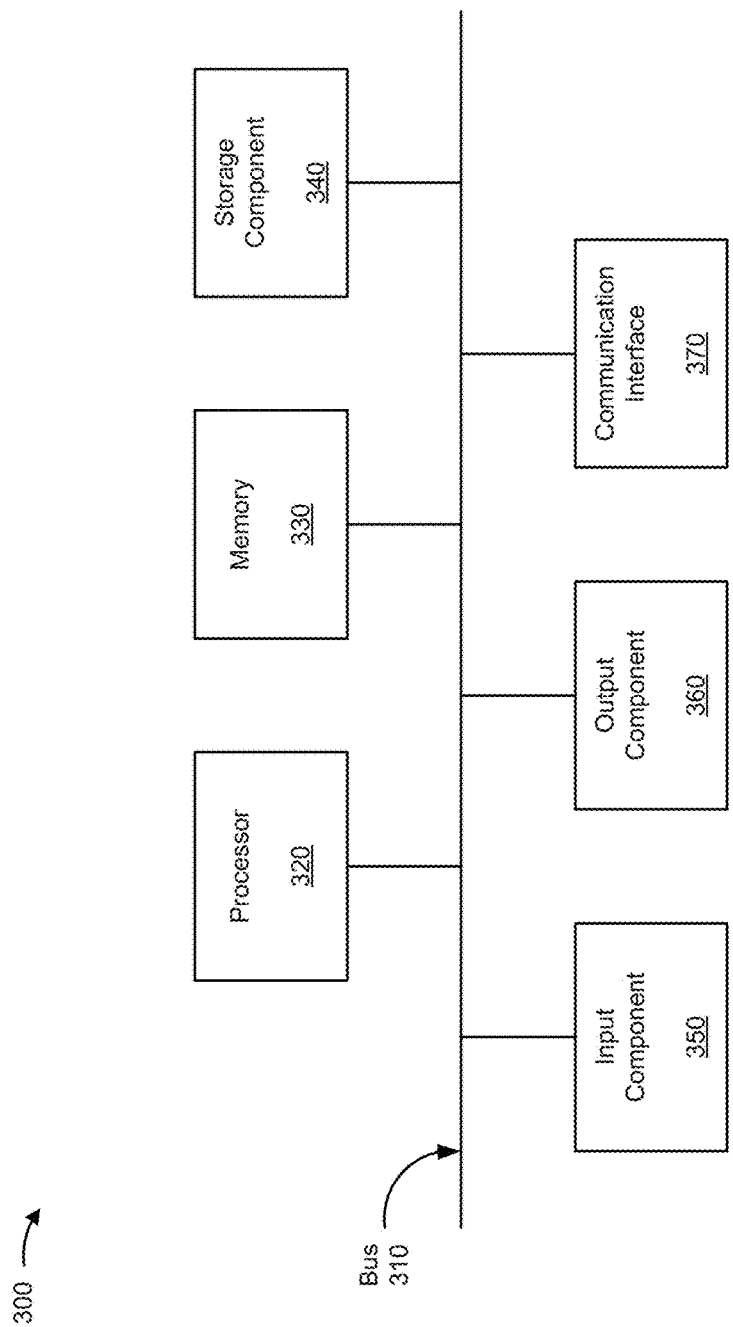
FIG. 3 is a diagram of example components of one or more devices of FIG. 2.

FIG. 3 is a diagram of example components of a device 300. Device 300 may correspond to user device 205, base station 210, MME 215, SGW 220, PGW 225, campaign enforcement device 230, campaign provisioning device 235, AAA 240, campaign management device 245, campaign input device 250, and/or content provider device 255. In some implementations, user device 205, base station 210, MME 215, SGW 220, PGW 225, campaign enforcement device 230, campaign provisioning device 235, AAA 240, campaign management device 245, campaign input device 250, and/or content provider device 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
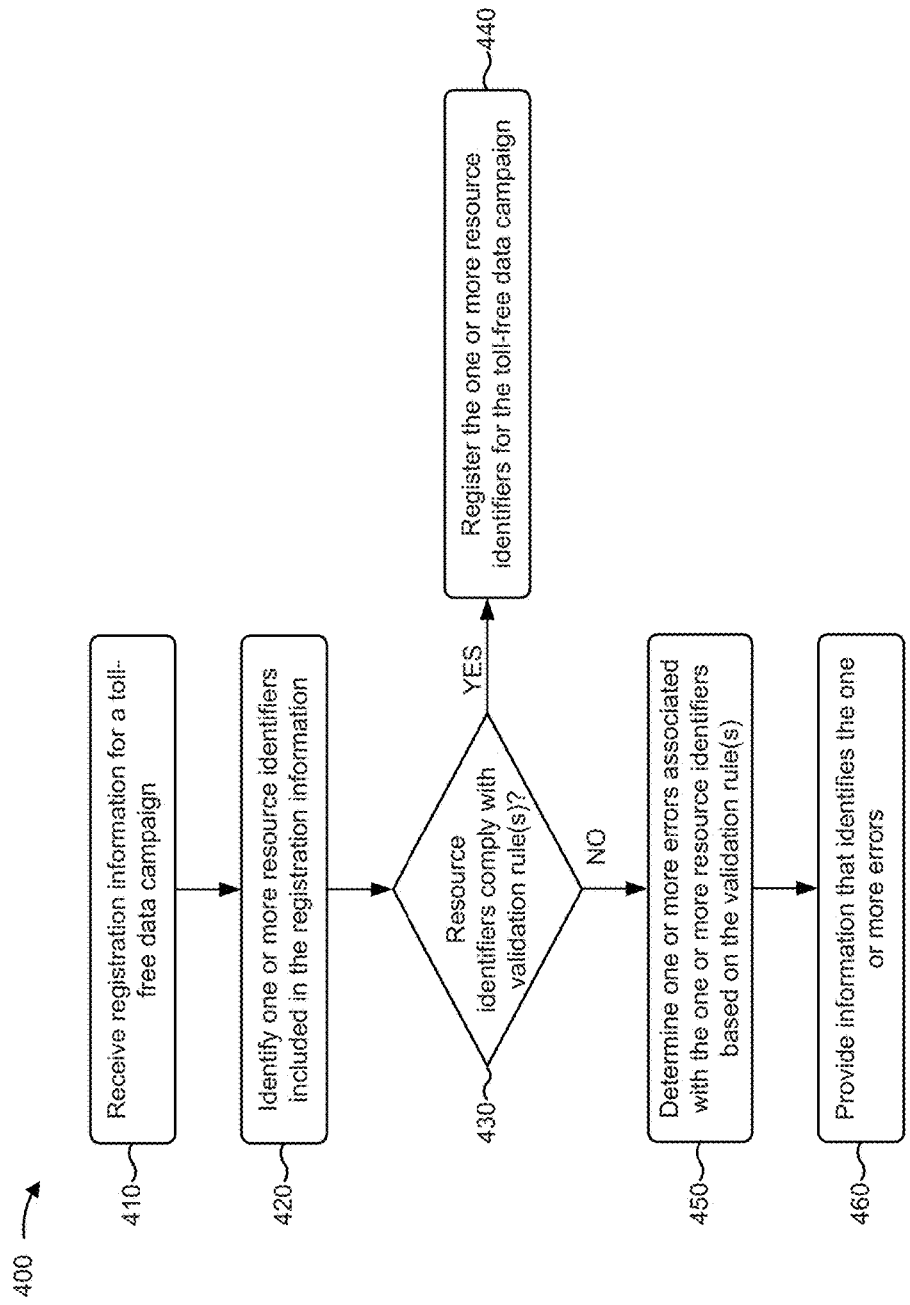
FIG. 4 is a flow chart of an example process for validating resource identifiers being registered for a toll-free data campaign.

FIG. 4 is a flow chart of an example process 400 for validating resource identifiers being registered for a toll-free data campaign. In some implementations, one or more process blocks of FIG. 4 may be performed by a campaign management device 245. In some implementations, one or more process blocks of FIG. 4 may be performed by another device or a group of devices separate from or including campaign management device 245, such as user device 205, base station 210, MME 215, SGW 220, PGW 225, campaign enforcement device 230, campaign provisioning device 235, AAA 240, campaign input device 250, and/or content provider device 255.

As shown in FIG. 4, process 400 may include receiving registration information for a toll-free data campaign (block 410). For example, campaign management device 245 may receive registration information for a toll-free data campaign from campaign input device 250 based on user input (e.g., such as input from a content provider agent). In some implementations, the toll-free data campaign may correspond to content that content provider device 255 provides to user devices 205 of network users without network data usage fees associated with the content being levied against the network users. In other words, content provider device 255 may provide the content for free to user devices 205 by paying fees associated with the network data usage for the content.

In some implementations, the registration information may include a provider identifier. The provider identifier may include information that identifies the content provider. For example, the provider identifier may be a string of characters that represents the content provider, such as a name of the content provider (e.g., a company), a customer number, a username, or the like.

Additionally, or alternatively, the registration information may include a time period or a time characteristic for the toll-free data campaign. The time period may include a start date and/or start time and an end date and/or end time that indicate when the toll-free data campaign is active (e.g., when network data usage associated with the toll-free data campaign is paid for by the content provider and is therefore "toll-free"). The time characteristic may include other criteria defining when the network data usage is paid for by the content provider. This may limit the toll-free data campaign to certain days of the week or certain times of a day. For example, the content provider may choose to pay for network data usage for weekday nights after 8 p.m. during the time period of the campaign.

Additionally, or alternatively, the registration information may include payment information. The payment information may include account information. Account information may include information that identifies an account that the content provider may use to pay for the network data usage (e.g., a bank account, a charge account, a customer account, etc.). Additionally, or alternatively, the payment information may include a budget. The budget may represent a threshold amount (e.g., a maximum amount) that the content provider is willing to pay for the network data usage associated with the campaign. Additionally, or alternatively, the payment information may identify a pricing model. The pricing model may define an event that constitutes a unit of pay. For example, the pricing model may be based on the amount of bytes used, may be based on the amount of times the content was accessed (e.g., via a click), or the like.

Additionally, or alternatively, the registration information may include one or more resource identifiers that identify the content associated with the campaign. A resource identifier may identify a location from which the content may be accessed. The resource identifier may include, for example, a uniform resource identifier (URI), such as a uniform resource locator (URL), a uniform resource name (URN), or the like.

As further shown in FIG. 4, process 400 may include identifying one or more resource identifiers included in the registration information (block 420). For example, campaign management device 245 may identify one or more resource identifiers included in the registration information. As described above, the registration information may include one or more resource identifiers that identify the content that is part of the toll-free data campaign. In other words, a resource identifier may identify a resource included in toll-free content and/or a location from which the resource may be accessed. Campaign management device 245 may identify these resource identifiers from the registration information. Additionally, or alternatively, campaign management device 245 may identify other parts of the registration information, such as a time period, during which the campaign is active.

As further shown in FIG. 4, process 400 may include determining whether the one or more resource identifiers comply with one or more validation rules (block 430). For example, campaign management device 245 may identify whether the one or more resource identifiers comply with one or more validation rules. A validation rule may include a rule against which one or more resource identifiers are to be validated before being registered for a toll-free data campaign. In some implementations, a validation rule may ensure that the resource identifiers being registered for the toll-free data campaign are valid (e.g., in a particular format, such as a required format that follows a standard), are not duplicative of another resource identifier being registered for the toll-free data campaign or registered for an overlapping campaign (e.g., campaigns that overlap in time period), or the like.

In some implementations, the validation rule may include a format rule that requires a resource identifier to be in the required format. The required format may be a standard format for resource identifiers (e.g., a standard format for a URL). For example, when the resource identifier is a URL, the format rule may require campaign management device 245 to verify that the URL begins with the character string "http://" or "https://" or "www" or a domain name or a related string. Additionally, or alternatively, the format rule may include a requirement that the URL does not include one or more particular characters to ensure that the URL complies with the required format, such as a curly bracket ("{" or "}"), a space, or the like. Additionally, or alternatively, the format rule may include a requirement that the URL end with a period followed by a top level domain (e.g., ".com," ".net," ".org," ".de," etc.). The format rule is beneficial because the format rule ensures that only valid resource identifiers may be registered for the toll-free data campaign.

In some implementations, to apply the format rule, campaign management device 245 may have to perform several particular actions. For example, campaign management device 245 may have to search the URL for a curly bracket. Campaign management device 245 may compare the beginning of the URL to one or more acceptable character string patterns. Likewise, campaign management device 245 may compare the end of the URL to one or more other acceptable character string patterns (e.g., one for each top level domain). Additionally, or alternatively, campaign management device 245 may attempt to access a webpage associated with the URL to determine whether the URL is valid (e.g., if campaign management device 245 successfully accesses the webpage) or invalid (e.g., if campaign management device 245 could not successfully access the webpage).

Additionally, or alternatively, the validation rule may include a duplicate resource identifier rule. The duplicate resource identifier rule may include a rule that campaign management device 245 uses to ensure that a resource identifier is not a duplicate of another resource identifier being registered and/or is not already registered for a campaign with an overlapping time period (e.g., the campaign is active during the time period associated with the resource identifier(s) being registered). Campaign management device 245 may compare the resource identifier(s) being registered to other resource identifier(s), associated with toll-free data campaign(s) that have an overlapping time period, stored in a data structure available to campaign management device 245 (e.g., via campaign provisioning device 235 or stored by). Additionally, or alternatively, campaign management device 245 may compare the resource identifier(s) being registered with each other.

Campaign management device 245 may attempt to find a match, based on the comparison, between a first resource identifier that is included in the registration information and a second resource identifier that is associated with a toll-free data campaign (e.g., a registered resource identifier). If there is a match, then the first resource identifier may not have met the requirements of the duplicate resource identifier rule because the second resource identifier, which matches the first resource identifier, is already registered for a toll-free data campaign within the time period.

In some implementations, campaign management device 245 may compare the one or more resource identifiers, from the registration information, with each other. Campaign management device 245 may attempt to find a match, based on the comparison, between a first resource identifier included in the registration information and a second resource identifier included in the registration information. The duplicate resource identifier rule is useful in ensuring that a resource identifier is not associated with more than one toll-free data campaign within a particular time period, thereby making sure that the content provider is not charged more than once for the network data usage associated with the resource identifier.

Additionally, or alternatively, the validation rule may include a resource identifier subfolder rule. The resource identifier subfolder rule may include a rule that campaign management device 245 uses to ensure that a resource identifier is not associated with a subfolder (e.g., the resource identifier is in the subfolder or identifies the subfolder), of another resource identifier from the registration information or a registered resource identifier associated with toll-free data campaigns with an overlapping time period. For example, "http://example.com/images" identifies a subfolder of "http://example.com," which identifies a parent folder to "http://example.com/images." Campaign management device 245 may search registered resource identifier(s) for a resource identifier that is a parent folder of the resource identifier(s) included in the registration information. Additionally, or alternatively, campaign management device 245 may search the registration information for resource identifier(s) that are associated with subfolders or identify parent folders of other resource identifier(s) included in the registration information.

For example, if the resource identifier being registered is "http://example.com/images/beaches," then campaign management device 245 may search if another resource identifier that identifies a parent folder of the resource identifier, such as "http://example.com" or "http://example.com/images," is a registered resource identifier associated with a campaign with an overlapping time period. However, campaign management device 245 may not search for resource identifiers that are associated with "http://example.com" but do not identify parent folders, such as "http://example.com/directory" or "http://example.com/images/mountains."

Additionally, or alternatively, campaign management device 245 may search for parent folders of the resource identifier being registered among the one or more resource identifiers (e.g., to ensure that the registration information does not include a resource identifier that identifies a parent folder of another resource identifier). If there is a match between a parent folder of the resource identifier being registered and a registered resource identifier or another resource identifier included in the registration information, then the resource identifier may not have met the requirements of the resource identifier subfolder rule. The resource identifier subfolder rule is useful in ensuring that a resource identifier is not associated with more than one toll-free data campaign within a particular time period, thereby making sure that the content provider is not charged more than once for the network data usage associated with the resource identifier.

Additionally, or alternatively, the validation rule may include a resource identifier subdomain rule. Similar to the resource identifier subfolder rule, the resource identifier subdomain rule may include a rule that campaign management device 245 uses to ensure that the resource identifier is not associated with a subdomain (e.g., identify the subdomain, or is in the subdomain) of another resource identifier from the registration information or a resource identifier that is already registered for a campaign with an overlapping time period. For example, "http://images.example.com" identifies a subdomain of "http://example.com," which identifies a parent domain to "http://images.example.com." Campaign management device 245 may search registered resource identifiers for a resource identifier that is a parent domain of resource identifier(s) included in the registration information. Additionally, or alternatively, campaign management device 245 may search the registration information for resource identifier(s) that are associated with subdomains or identify parent domains of other resource identifier(s) included in the registration information.

For example, if the resource identifier being registered is "http://beaches.images.example.com," then campaign management device 245 may search if another resource identifier that identifies a parent domain, such as "http://example.com" or "http://images.example.com," is a registered resource identifier associated with a campaign with an overlapping time period. However, campaign management device 245 may not search for registered resource identifiers associated with "http://example.com" that do not identify a parent domain of the resource identifier being registered ("http://beaches.images.example.com"), such as "http://directory.example.com" or "http://mountains.images.example.com."

Additionally, or alternatively, campaign management device 245 may search for parent domains of the resource identifier being registered among the one or more resource identifiers (e.g., to ensure that the registration information does not include a resource identifier that identifies a parent domain of another resource identifier). If there is a match between a parent domain of the resource identifier being registered and a registered resource identifier or another one of the one or more resource identifiers included in the registration information, then the resource identifier may not have met the requirements of the resource identifier subdomain rule. The resource identifier subdomain rule is useful in ensuring that a resource identifier is not associated with more than one toll-free data campaign within a particular time period, thereby making sure that the content provider is not charged more than once for the network data usage associated with the resource identifier.

In some implementation, campaign management device 245, when executing the duplicate resource identifier rule, the resource identifier subfolder rule, and/or the resource identifier subdomain rule, may compare the one or more resource identifiers to only registered resource identifiers from campaigns where the budget for the campaign has not been exceeded (e.g., is below the maximum amount). In some implementations, campaign management device 245 may compare the one or more resource identifiers to registered resource identifiers for all campaigns associated with a time period that overlaps with a time period of the campaign being registered. In this case, campaign management device 245 may apply validation rules in association with campaigns that are modifiable (e.g., when the budget of the campaign is permitted to be modified).

As further shown in FIG. 4, if the one or more resource identifiers comply with the one or more validation rules (block 430—YES), then process 400 may include registering the one or more resource identifiers for the toll-free data campaign (block 440). For example, campaign management device 245 may register the one or more resource identifiers if the resource identifiers comply with the validation rules. Campaign management device 245 may register the one or more resource identifiers by sending the one or more resource identifiers and the registration information to campaign provisioning device 235 to provision and/or enforce the toll-free data campaign. In turn, campaign provisioning device 235 may create and enforce campaign rules, using campaign enforcement device 230, for the toll-free data campaign based on the registration information and the one or more resource identifiers.

The campaign rules may apply to the one or more resource identifiers. The campaign rules may be used to enforce specific inputs from the registration information. For example, campaign provisioning device 235 may create and enforce a campaign rule for the one or more resource identifiers that limits the enforcement of the campaign to the time period included in the registration information. As another example, campaign provisioning device 235 may enforce the budget associated with the one or more resource identifiers, so that the network data usage associated with the one or more resource identifiers does not exceed the budget (e.g., meets the maximum amount). Similarly, campaign provisioning device 235 may create campaign rules that enforce other inputs from the registration information. Additionally, or alternatively, campaign provisioning device 235 and/or campaign management device 245 may store the one or more resource identifiers in a data structure that associates campaign rules with the one or more resource identifiers, and that indicates whether the associated toll-free data campaign is active (e.g., that indicates whether the toll-free data campaign has a time period that corresponds to a current time and that the budget has not been exceeded).

As further shown in FIG. 4, if the one or more resource identifiers do not comply with the one or more validation rules (block 430—NO), then process 400 may include determining one or more errors associated with the one or more resource identifiers based on the validation rules (block 450). For example, campaign management device 245 may determine one or more errors for the one or more resource identifiers when the one or more resource identifiers do not comply with the validation rule(s). An error may be based on noncompliance of a validation rule. As described above, campaign management device 245 may verify whether each of the resource identifiers complies with each of the validation rules. Campaign management device 245 may generate error information that identifies a resource identifier that does not comply with the validation rules and which associates the resource identifier with particular validation rules with which that resource identifier does not comply (e.g., errors of the resource identifier). In some implementations, campaign management device 245 may include, in the error information, an error message for an error associated with a resource identifier. The error message may be a string of characters used to explain why the resource identifier does not comply with one or more validation rules. For example, the content of the error message may include the character string, "URL with same domain name exists," or the like.

As further shown in FIG. 4, process 400 may include providing information that identifies the one or more errors (block 460). For example, campaign management device 245 may provide information that identifies the one or more errors (e.g., the error information) to campaign input device 250. In some implementations, the error information may include an error message associated with a particular resource identifier that did not comply with a particular validation rule. Campaign input device 250 may provide the error message for display. In some implementations, the error information may include information that identifies an error (e.g., which particular validation rule was not complied with) and a resource identifier with which the error is associated. In this case, campaign input device 250 may provide an error message for display in association with the resource identifier associated with the error. By providing the error information to campaign input device 250, campaign management device 245 helps identify why the one or more resource identifiers were not registered and allows a user using campaign input device 250 to adjust the registration information accordingly.

Furthermore, by identifying errors and not registering the one or more resource identifiers, campaign management device 245 prevents errors based on charging a content provider more than once for network data usage associated with the one or more resource identifiers. Furthermore, campaign management device 245 can avoid registering any invalid resource identifiers (e.g., resource identifiers that are not in the required format). In this way, campaign management device 245, saves processor and memory resources associated with unnecessary transactions or invalid resource identifiers.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
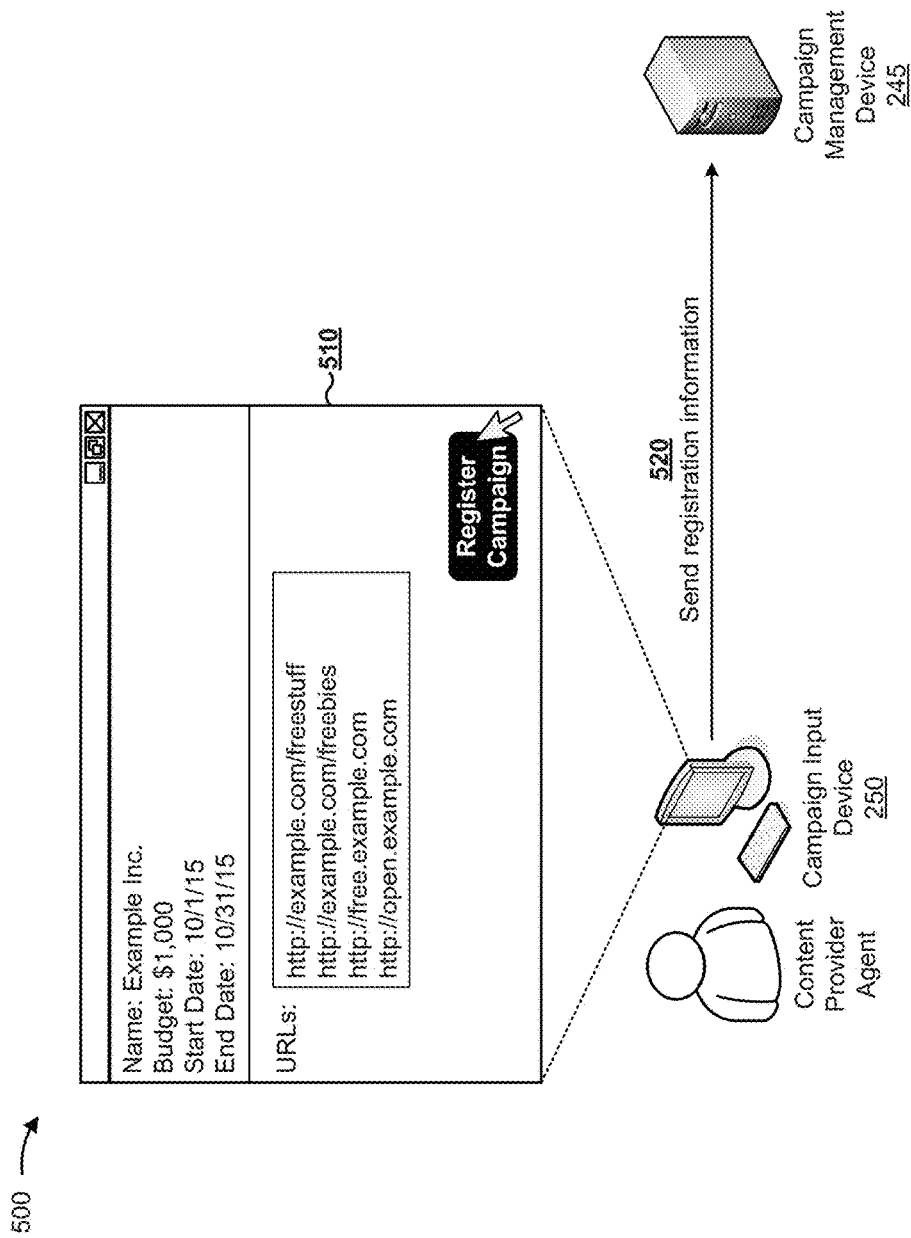
FIGS. 5A and 5B are diagrams of an example implementation relating to the example process shown in FIG. 4.
Figure 5B:
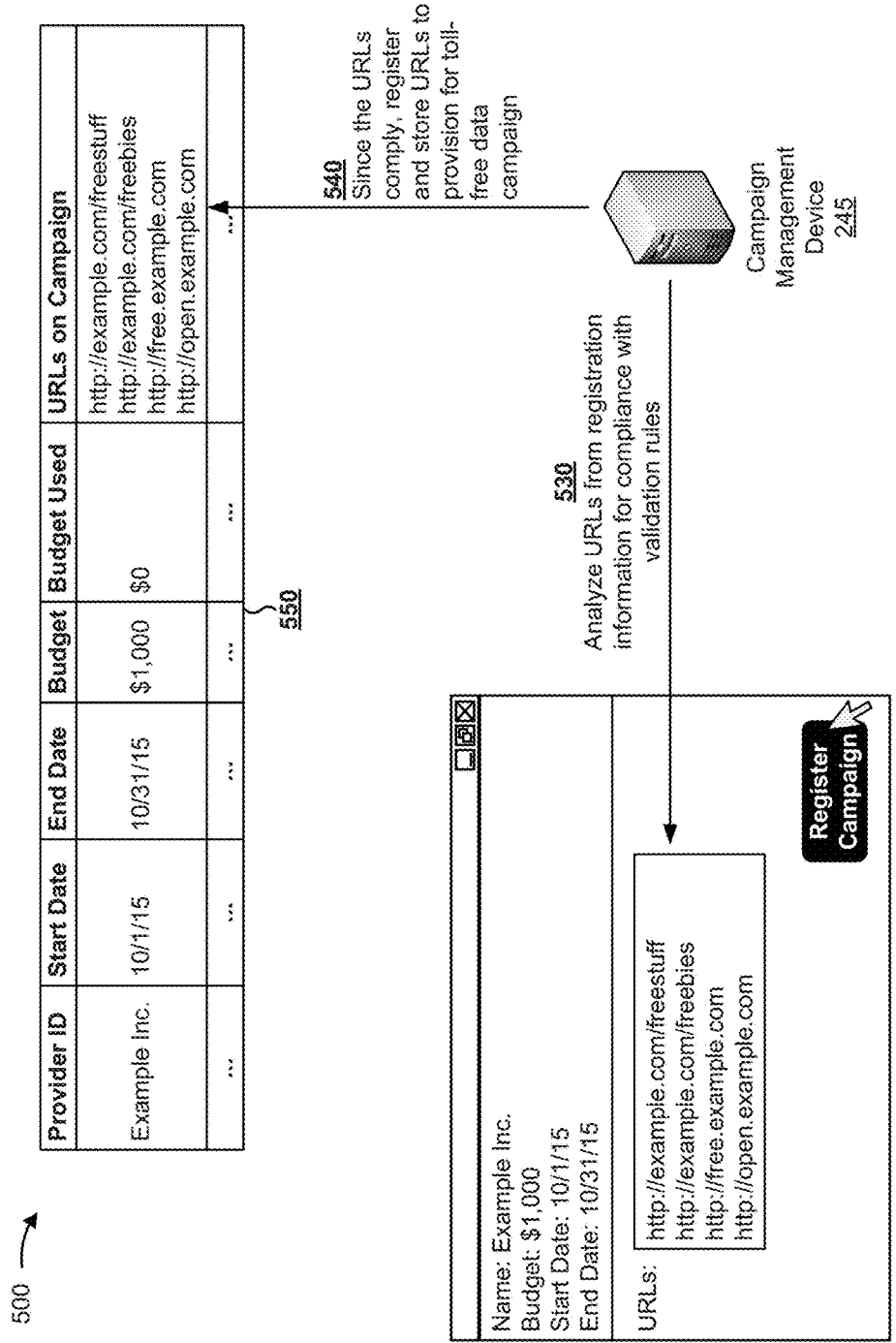

FIGS. 5A and 5B are diagrams of an example implementation 500 relating to example process 400 shown in FIG. 4.

FIGS. 5A and 5B show an example of validating and registering resource identifiers for a toll-free data campaign.

As shown in FIG. 5A, and by reference number 510, assume that a content provider agent registers for a toll-free data campaign using campaign input device 250. As shown, registration information for the toll-free data campaign includes a name (Example Inc.), a budget ($1,000), a start date (Oct. 1, 2015), an end date (Oct. 31, 2015), and a list of URLs to register for the toll-free data campaign (http://example.com/freestuff, http://example.com/freebies, http://free.example.com, and http://open.example.com). As shown by reference number 520, campaign input device 250 sends the registration information to campaign management device 245.

As shown in FIG. 5B, and by reference number 530, campaign management device 245 analyzes the URLs from the registration information for compliance with the validation rules. As shown by reference number 540, campaign management device 245 determines that the URLs comply with the validation rules and stores the URLs to provision the URLs for the toll-free data campaign. As shown by reference number 550, the registration information is stored in a data structure in fields corresponding to inputs from the registration information. Specifically, the data structure includes a provider identifier (Example Inc.), a start date (Oct. 1, 2015), an end date (Oct. 31, 2015), a budget ($1,000), and URLs that are part of the campaign (as shown, the URLs from the registration information). Furthermore, the data structure includes an additional field to track an amount of the budget that has been used in the campaign, which is shown as $0 because the campaign was just registered.

As shown, the URLs do not violate any of the validation rules described in connection with block 430 of FIG. 4. All of the URLs are in the required format (e.g., follow a standard format of a URL). Furthermore, none of the URLs are a duplicate of another URL being registered or already registered, and none of the URLs identify a parent domain or a parent folder to another URL being registered or already registered.

As indicated above, FIGS. 5A and 5B are provided merely as an example. Other examples are possible and may differ from what was described with regard to FIGS. 5A and 5B.

Figure 6A:
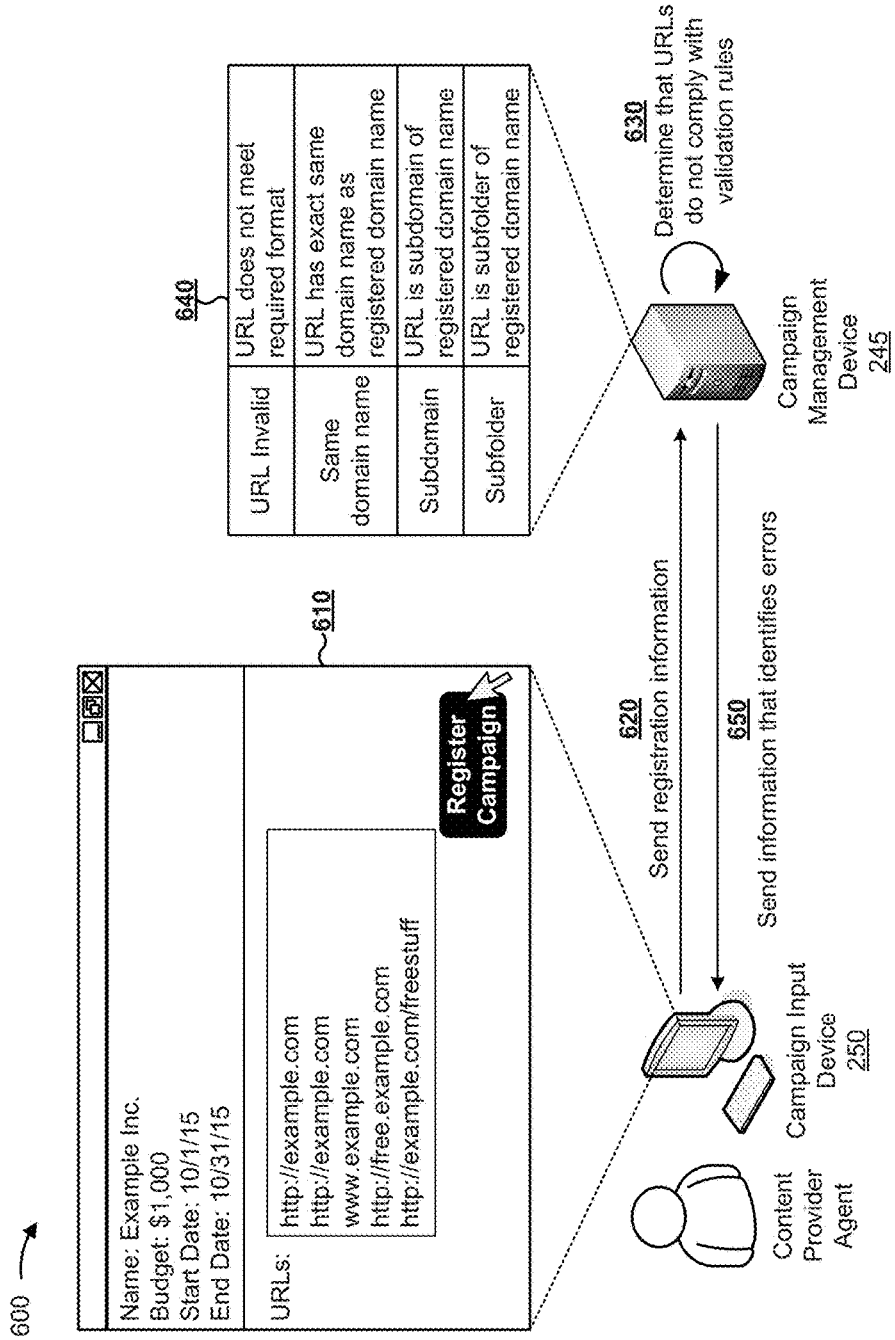
FIGS. 6A and 6B are diagrams of another example implementation relating to the example process shown in FIG. 4.
Figure 6B:
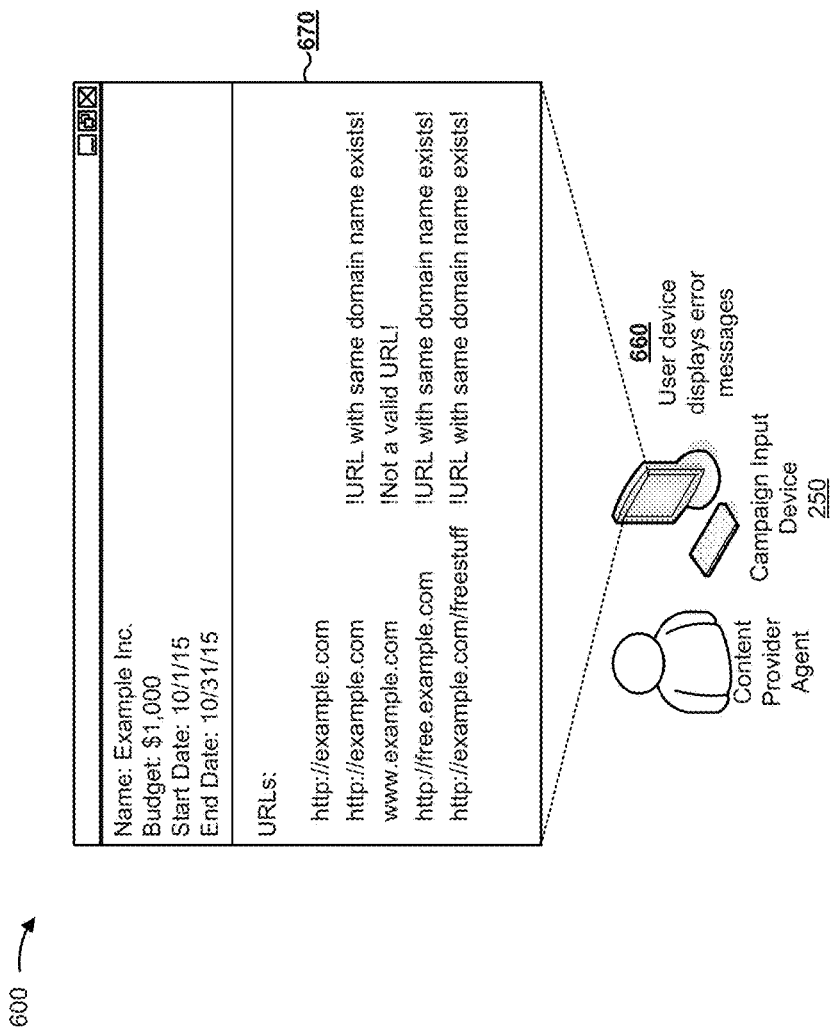

FIGS. 6A and 6B are diagrams of another example implementation 600 relating to example process 400 shown in FIG. 4. FIGS. 6A and 6B show an example of resource identifiers failing validation while being registered for a toll-free data campaign.

As shown in FIG. 6A, and by reference number 610, assume that a content provider agent registers for a toll-free data campaign using campaign input device 250. As shown, registration information for the toll-free data campaign includes a name (Example Inc.), a budget ($1,000), a start date (Oct. 1, 2015), an end date (Oct. 31, 2015), and a list of URLs to register for the toll-free data campaign (http://example.com, http://example.com, www.example.com, http://free.example.com, and http://example.com/freestuff). As shown by reference number 620, campaign input device 250 sends the registration information to campaign management device 245.

As shown by reference number 630, campaign management device 245 determines that some of the URLs do not comply with validation rules, meaning that the URLs have errors. As shown by reference number 640, the validation rules include a rule that the URLs satisfy a required format, a rule that a URL cannot be registered already or cannot be included more than once in the registration information, a rule that the URL cannot identify a subdomain or be in a subdomain of a registered URL or of one of the other URLs being registered, and a rule that the URL cannot identify a subfolder or be in a subfolder of a registered URL or of one of the URLs being registered. As shown by reference number 650, campaign management device 245 sends, to campaign input device 250, information that identifies the errors based on some of the URLs not complying with the validation rules.

As shown in FIG. 6B, and by reference number 660, campaign input device 250 displays error messages relating to the errors found by campaign management device 245. As shown by reference number 670, error messages are displayed in association with URLs that do not comply with the validation rules. For example, as shown, the URL "http://example.com" is listed twice in the registration information, and therefore there is an error message that indicates that a URL with the same domain name exists the second time the URL is listed. An error message is also given for "www.example.com," because "www.example.com" is not a standard format for a URL, and therefore the error message indicates that "www.example.com" is not a valid URL (e.g., is missing http://). Assume that "www.example.com" is not a valid URL for this example, and that in some implementations, "www.example.com" may be an acceptable format. The URLs "http://free.example.com" and "http://example.com/freestuff" display an error message that indicates that a URL with the domain name exists because "http://example.com" identifies the parent domain and the parent folder of these URLs. By identifying errors associated with the resource identifiers, campaign management device 245 avoids charging a service provide more than once, or avoids adding an invalid URL to the toll-free data campaign.

As indicated above, FIGS. 6A and 6B are provided merely as an example. Other examples are possible and may differ from what was described with regard to FIGS. 6A and 6B.

By identifying errors with resource identifiers based on the validation rules, campaign management device 245 prevents errors based on charging a content provider more than once for network data usage associated with the a resource identifier. Furthermore, campaign management device 245 does not register any invalid resource identifiers (e.g., a resource identifier that is not in a valid format). In this way, campaign management device 245 may save processor and memory resources associated with unnecessary transactions or invalid URLs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processors to:
        receive registration information for a toll-free data campaign,
            the toll-free data campaign allowing a content provider to pay costs of network data usage by user devices that access content associated with the toll-free data campaign;
        identify one or more resource identifiers included in the registration information,
            the one or more resource identifiers identifying the content associated with the toll-free data campaign;
        apply one or more validation rules to the one or more resource identifiers to validate registration of the one or more resource identifiers for provisioning of the toll-free data campaign;
        determine whether the one or more resource identifiers are associated with one or more errors based on applying the one or more validation rules; and
        selectively register the one or more resource identifiers for the toll-free data campaign based on determining whether the one or more resource identifiers are associated with the one or more errors,
            where registration of the one or more resource identifiers is performed when the one or more resource identifiers are associated with no errors; and
            where registration of the one or more resource identifiers is prevented when the one or more resource identifiers are associated with one or more errors.

2. The device of claim 1, where the one or more validation rules include a rule that determines whether the one or more resource identifiers are in a particular format.

3. The device of claim 1, where the one or more processors, when applying the one or more validation rules, are to:
    compare the one or more resource identifiers to each other and/or to one or more registered resource identifiers,
        the one or more registered resource identifiers being associated with one or more other toll-free data campaigns; and
    determine whether a resource identifier, of the one or more resource identifiers, matches a registered resource identifier, of the one or more registered resource identifiers, and/or another resource identifier of the one or more resource identifiers.

4. The device of claim 1, where the one or more processors, when applying the one or more validation rules, are to:
    compare the one or more resource identifiers to each other and/or to one or more registered resource identifiers,
        the one or more registered resource identifiers being associated with one or more other toll-free data campaigns; and
    determine whether a resource identifier, of the one or more resource identifiers, is associated with a subfolder or a subdomain, of a registered resource identifier, of the one or more registered resource identifiers, and/or of another resource identifier of the one or more resource identifiers.

5. The device of claim 1, where the one or more processors, when applying the one or more validation rules, are to:
    determine whether the one or more resource identifiers are in a particular format;
    compare the one or more resource identifiers to each other and/or to one or more registered resource identifiers,
        the one or more registered resource identifiers being associated with one or more other toll-free data campaigns; and
    determine whether a resource identifier, of the one or more resource identifiers, matches a registered resource identifier, of the one or more registered resource identifiers, and/or another resource identifier of the one or more resource identifiers.

6. The device of claim 1, where the one or more processors, when applying the one or more validation rules, are to:
    identify a time period, from the registration information, associated with the toll-free data campaign;
    compare the one or more resource identifiers to one or more registered resource identifiers,
        the one or more registered resource identifiers being associated with one or more other toll-free data campaigns that are active during the time period;
    determine whether a resource identifier, of the one or more resource identifiers, matches a registered resource identifier of the one or more registered resource identifiers; and
    determine whether the resource identifier is associated with a subfolder or a subdomain of the registered resource identifier.

7. A computer-readable medium storing instructions, the instructions comprising:
one or more instructions that, when executed by one or more processors, cause the one or more processors to:
receive registration information associated with a toll-free data campaign,
the toll-free data campaign allowing a content provider to pay costs of network data usage by user devices that access content associated with the toll-free data campaign;
identify a plurality of resource identifiers, included in the registration information, for accessing the content associated with the toll-free data campaign;
determine whether the plurality of resource identifiers comply with one or more validation rules to validate registration of the plurality of resource identifiers for provisioning of the toll-free data campaign; and
selectively register the plurality of resource identifiers for the toll-free data campaign when the plurality of resource identifiers comply with the one or more validation rules,
where the plurality of resource identifiers are registered when the plurality of resource identifiers comply with the one or more validation rules; and
where the plurality of resource identifiers are not registered when the plurality of resource identifiers do not comply with the one or more validation rules.

8. The computer-readable medium of claim 7, where the one or more validation rules include a rule that determines whether the plurality of resource identifiers are in a particular format.

9. The computer-readable medium of claim 7, where the one or more instructions, that cause the one or more processors to determine whether the plurality of resource identifiers comply with the one or more validation rules, cause the one or more processors to:
compare a first resource identifier, included in the plurality of resource identifiers, and a second resource identifier included in the plurality of resource identifiers; and
determine whether the first resource identifier matches the second resource identifier based on comparing the first resource identifier and the second resource identifier.

10. The computer-readable medium of claim 7, where the one or more instructions, that cause the one or more processors to determine whether the plurality of resource identifiers comply with the one or more validation rules, cause the one or more processors to:
compare a first resource identifier, included in the plurality of resource identifiers, and a second resource identifier included in the plurality of resource identifiers; and
determine whether the first resource identifier identifies a parent folder of the second resource identifier based on comparing the first resource identifier and the second resource identifier.

11. The computer-readable medium of claim 7, where the one or more instructions, that cause the one or more processors to determine whether the plurality of resource identifiers comply with the one or more validation rules, cause the one or more processors to:
compare a first resource identifier, included in the plurality of resource identifiers, and a second resource identifier included in the plurality of resource identifiers; and
determine whether the first resource identifier identifies a parent domain of the second resource identifier based on comparing the first resource identifier and the second resource identifier.

12. The computer-readable medium of claim 7, where the one or more instructions, that cause the one or more processors to determine whether the plurality of resource identifiers comply with the one or more validation rules, cause the one or more processors to:
determine whether the plurality of resource identifiers are in a particular format;
compare a first resource identifier, included in the plurality of resource identifiers, and a second resource identifier included in the plurality of resource identifiers;
determine whether the first resource identifier matches the second resource identifier based on comparing the first resource identifier and the second resource identifier; and
determine whether the first resource identifier identifies a parent domain or a parent folder of the second resource identifier based on comparing the first resource identifier and the second resource identifier.

13. The computer-readable medium of claim 7, where the one or more instructions, that cause the one or more processors to determine whether the plurality of resource identifiers comply with the one or more validation rules, cause the one or more processors to:
determine whether the plurality of resource identifiers are in a particular format;
compare a first resource identifier, included in the plurality of resource identifiers, and a second resource identifier included in the plurality of resource identifiers; and
determine whether the first resource identifier matches the second resource identifier based on comparing the first resource identifier and the second resource identifier.

14. A method, comprising:
receiving, by a device, registration information for a toll-free data campaign,
the toll-free data campaign allowing a content provider to pay costs of network data usage by user devices that access content associated with the toll-free data campaign;
identifying, by the device, one or more resource identifiers, that provide access to the content associated with the toll-free data campaign, included in the registration information;
determining, by the device, whether the one or more resource identifiers comply with one or more validation rules to validate registration of the one or more resource identifiers for provisioning of the toll-free data campaign; and
selectively registering, by the device, the one or more resource identifiers for the toll-free data campaign,
where registration of the one or more resource identifiers is performed when the one or more resource identifiers comply with the one or more validation rules; and
where registration of the one or more resource identifiers is prevented when the one or more resource identifiers do not comply with the one or more validation rules.

15. The method of claim 14, where determining whether the one or more resource identifiers comply with the one or more validation rules comprises:
determining whether the one or more resource identifiers are in a particular format.

16. The method of claim 14, where determining whether the one or more resource identifiers comply with the one or more validation rules comprises:
- determining a time period, from the registration information, associated with the toll-free data campaign;
- comparing the one or more resource identifiers to one or more registered resource identifiers,
  - the one or more registered resource identifiers being associated with one or more other toll-free data campaigns that are active during the time period; and
- determining whether a resource identifier, of the one or more resource identifiers, matches a registered resource identifier of the one or more registered resource identifiers.

17. The method of claim 14, where determining whether the one or more resource identifiers comply with the one or more validation rules comprises:
- determining a time period, from the registration information, associated with the toll-free data campaign;
- comparing the one or more resource identifiers to one or more registered resource identifiers,
  - the one or more registered resource identifiers being associated with one or more other toll-free data campaigns that are active during the time period; and
- determining whether a resource identifier, of the one or more resource identifiers, is associated with a subfolder or a subdomain of a registered resource identifier of the one or more registered resource identifiers.

18. The method of claim 14, where determining whether the one or more resource identifiers comply with the one or more validation rules further comprises:
- determining a time period, from the registration information, associated with the toll-free data campaign;
- comparing the one or more resource identifiers to one or more registered resource identifiers,
  - the one or more registered resource identifiers being associated with one or more other toll-free data campaigns that are active during the time period;
- determining whether a resource identifier, of the one or more resource identifiers, matches a registered resource identifier of the one or more registered resource identifiers; and
- determining whether the resource identifier is associated with a subfolder or a subdomain of the registered resource identifier.

19. The method of claim 14, where determining whether the one or more resource identifiers comply with the one or more validation rules further comprises:
- comparing the one or more resource identifiers to one or more registered resource identifiers,
  - the one or more registered resource identifiers being associated with one or more other toll-free data campaigns, associated with a budget, in which the budget has not been exceeded; and
- determining at least one of:
  - whether a resource identifier, of the one or more resource identifiers, matches a registered resource identifier of the one or more registered resource identifiers, or
  - whether the resource identifier is associated with a subfolder or a subdomain of the registered resource identifier.

20. The device of claim 1, where the one or more processors, when applying the one or more validation rules, are to:
- attempt to access the content using the one or more resource identifiers; and
- determine whether the one or more resource identifiers are valid based on whether the content is successfully accessed,
  - where registration of the one or more resource identifiers is performed when the content is successfully accessed; and
  - where registration of the one or more resource identifiers is prevented when the content is unsuccessfully accessed.

* * * * *